United States Patent
Lu et al.

(10) Patent No.: US 6,782,315 B2
(45) Date of Patent: Aug. 24, 2004

(54) METHOD AND APPARATUS FOR COMPENSATING MISALIGNMENTS OF A SENSOR SYSTEM USED IN A VEHICLE DYNAMIC CONTROL SYSTEM

(75) Inventors: Jianbo Lu, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 10/174,971

(22) Filed: Jun. 19, 2002

(65) Prior Publication Data

US 2003/0236604 A1 Dec. 25, 2003

(51) Int. Cl.[7] ............................................... B60R 21/32
(52) U.S. Cl. ............................ 701/45; 701/48; 701/38; 280/735; 180/271; 340/440
(58) Field of Search ............................. 701/28, 29, 50, 701/45, 37, 38, 48, 35; 340/671, 436, 425, 440; 280/735, 734; 180/271, 268, 281

(56) References Cited

U.S. PATENT DOCUMENTS

| | | | |
|---|---|---|---|
| 5,527,003 A | 6/1996 | Diesel et al. | |
| 5,789,671 A | 8/1998 | Fernandez | |
| 5,890,084 A | * 3/1999 | Halasz et al. | 701/45 |
| 5,964,822 A | 10/1999 | Alland et al. | |
| 6,002,975 A | * 12/1999 | Schiffmann et al. | 701/36 |
| 6,026,353 A | 2/2000 | Winner | |
| 6,081,230 A | 6/2000 | Hoshino et al. | |
| 6,192,305 B1 | * 2/2001 | Schiffmann | 701/45 |
| 6,236,916 B1 | 5/2001 | Staub et al. | |
| 6,292,759 B1 | * 9/2001 | Schiffmann | 702/151 |
| 6,332,103 B1 | * 12/2001 | Steenson et al. | 701/1 |
| 6,338,012 B2 | 1/2002 | Brown et al. | |
| 6,459,990 B1 | 10/2002 | McCall et al. | |
| 6,556,908 B1 | * 4/2003 | Lu et al. | 701/38 |
| 2002/0163437 A1 | 11/2002 | Haas | |

FOREIGN PATENT DOCUMENTS

WO     WO 01/11318 A1     2/2001

* cited by examiner

Primary Examiner—Thomas G. Black
Assistant Examiner—Arthur D. Donnelly
(74) Attorney, Agent, or Firm—Gary Smith

(57) ABSTRACT

A control system (18) for an automotive vehicle (10) having a vehicle body includes a sensor system (16) having housing (52) oriented within the vehicle body. Positioned within the housing (52) are a roll angular rate sensor (31), a yaw angular rate sensor (30), a pitch angular rate sensor (32), a lateral acceleration sensor (27), a longitudinal acceleration sensor (28), and a vertical acceleration sensor (29). The vehicle (10) also has a safety system (38). The controller (26) determines a roll misalignment angle, a pitch misalignment angle and a yaw misalignment angle as a function of the sensor outputs of the roll rate, the pitch rate, the yaw rate, the lateral acceleration, the longitudinal acceleration and the vertical acceleration. The motion variables the vehicle along the vehicle body-fixed frames, including the roll rate, the pitch rate, the yaw rate, the lateral acceleration, the longitudinal acceleration and the vertical acceleration, are then compensated based on the detected sensor misalignments and the sensor outputs of the roll rate, the pitch rate, the yaw rate, the lateral acceleration, the longitudinal acceleration and the vertical acceleration. The controller (26) generates a control signal for controlling the safety system in response to the compensated roll rate, pitch rate, yaw rate, lateral acceleration, longitudinal acceleration and vertical acceleration.

18 Claims, 3 Drawing Sheets

METHOD AND APPARATUS FOR COMPENSATING MISALIGNMENTS OF A SENSOR SYSTEM USED IN A VEHICLE DYNAMIC CONTROL SYSTEM

TECHNICAL FIELD

The present invention relates generally to a control apparatus for controlling a system of an automotive vehicle in response to sensed dynamic behavior, and more specifically, to a method and apparatus for compensating the system for a misalignment in the sensors of the system.

BACKGROUND

Dynamic control systems for automotive vehicles have recently begun to be offered on various products. Dynamic control systems typically control the yaw of the vehicle by controlling the braking effort at the various wheels of the vehicle. Yaw stability control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle roll stability control, it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

In the vehicle dynamics control systems described above, i.e., yaw and/or roll stability control, the vehicle motion states are controlled through electronically-controlled actuators. The vehicle motion states are usually defined using the vehicle body-fixed frame, called body frame. The three axes of the body frame are defined as x, y and z, where x axis is along the longitudinal forward direction of the vehicle, y axis is along the vehicle lateral direction point to the driver side and z axis is along the vertical direction of the vehicle.

In order to measure or estimate the vehicle motion states defined along the body-axes (x,y,z), motion sensors are used. For example, many systems include an integrated six sensor module set that has three gyro angular rate sensors and three linear acceleration sensors integrated into a single module. The three gyro rate sensors are intended to measure the angular rate of a vehicle about the longitudinal axis of the vehicle (roll rate, denoted as $\omega_x$), the angular rate about the lateral axis of the vehicle (pitch rate denoted as $\omega_y$) and the angular rate about the vertical axis of the vehicle (yaw rate denoted as $\omega_z$). The three acceleration sensors are intended to measure the accelerations along the longitudinal direction of the vehicle (denoted as $\alpha_x$), along the lateral direction of the vehicle (denoted as $\alpha_y$), and along the vertical direction of the vehicle (denoted as $\alpha_z$).

The six sensor outputs might not reflect the real vehicle motion states, which are defined along the vehicle body axes. This happens when the sensor directions of the sensor system do not coincide with the vehicle body axes (x,y,z). This may occur due to sensor mounting errors during insertion of the sensor system during manufacturing.

Other potential error sources for the aforementioned sensor systems exist, including the vibration-induced sensor errors described in WO 01/11318, steady state bias, and the thermal drift described in U.S. Pat. No. 5,527,003. Although those sensor errors can be compensated by using averaging and by learning the sensor bias, the sensor misalignments need to be treated differently. Since the misalignments generate sensor errors that are proportional to the magnitudes of the actual signals, the sensor error is very dynamic, unlike the errors caused by thermal drift and steady state bias.

Partial sensor misalignment has been studied for inertial navigation systems in U.S. Pat. No. 5,789,671 and U.S. Pat. No. 6,081,230, for a forward-looking vehicle sensor in U.S. Pat. No. 5,964,822, and for a vehicle clearance sensor in U.S. Pat. No. 6,026,353. None, however, describe compensation for a sensor system used for a dynamic control system such as a yaw stability control system or a roll stability control system.

It is therefore desirable to detect the amount of errors in the sensor outputs due to sensor misalignments and compensate the various measurements therefore.

SUMMARY OF THE INVENTION

The present invention is directed to the roll, pitch and yaw misalignments $\Delta\theta_x$, $\Delta\theta_y$ and $\Delta\theta_z$, and compensating the sensor outputs using those detected misalignment angles $\Delta\theta_x$, $\Delta\theta_y$ and $\Delta\theta_z$. In this disclosure, the sensor misalignments $\Delta\theta_x$, $\Delta\theta_y$ and $\Delta\theta_z$ are detected based on the sensor outputs and the computable vehicle motion states, through several sets of relationships between the sensor measurements and the vehicle motion variables.

In one aspect of the invention, a control system for an automotive vehicle having a vehicle body includes a sensor system having a housing oriented within the vehicle body, a roll angular rate sensor positioned within the housing generating a roll angular rate signal corresponding to a roll angular motion of the sensor housing, a yaw angular rate sensor positioned within the housing generating a yaw rate signal corresponding to a yaw motion of the sensor housing, a pitch angular rate sensor positioned within the housing generating a pitch rate signal corresponding to a pitch motion of the sensor housing, a lateral acceleration sensor positioned within the housing generating a lateral acceleration signal corresponding to a lateral acceleration of the sensor housing, a longitudinal acceleration sensor positioned within the housing generating a longitudinal acceleration signal corresponding to the longitudinal acceleration of the sensor housing, and a vertical acceleration sensor positioned within the housing generating a vertical acceleration signal corresponding to the vertical acceleration of the sensor housing. The vehicle also has a safety system such as an airbag, an active braking system, and active steering system, or an active suspension system. A controller is coupled to the roll angular rate sensor, the yaw angular rate sensor, the pitch angular rate sensor, the lateral acceleration sensor, the longitudinal acceleration sensor, and the vertical acceleration sensor. The controller determines a roll misalignment angle, a pitch misalignment angle and a yaw misalignment angle as a function of the sensor outputs of the roll rate, the pitch rate, the yaw rate, the lateral acceleration, the longitudinal acceleration and the vertical acceleration. The controller generates a control signal for controlling the safety system in response to the roll misalignment angle, the pitch misalignment angle and the yaw misalignment angle and the other calculated and measured variables.

In a further aspect of the invention, a method for controlling a vehicle dynamics control system comprises: determining a roll misalignment angle; determining a pitch misalignment angle; determining a yaw misalignment angle; determining the longitudinal acceleration along the vehicle body fixed x-axis by projecting the longitudinal, lateral and vertical acceleration sensor outputs along the body-fixed x-axis in response to said roll misalignment angle, said pitch misalignment angle and the yaw misalignment angle; determining the lateral acceleration along the vehicle body fixed y-axis by projecting the longitudinal, lateral and vertical acceleration sensor outputs along the body-fixed y-axis in response to said roll misalignment angle, said pitch misalignment angle and the yaw misalignment angle; determining the vertical acceleration along the vehicle body fixed z-axis by projecting the longitudinal, lateral and vertical acceleration sensor outputs along the body-fixed z-axis in response to said roll misalignment angle, said pitch misalignment angle and the yaw misalignment angle; determining the roll rate along the vehicle body fixed x-axis by projecting the roll rate, pitch rate, and yaw rate sensor outputs along the body-fixed x-axis in response to said roll misalignment angle, said pitch misalignment angle and the yaw misalignment angle; determining the pitch rate along the vehicle body fixed y-axis by projecting the roll rate, pitch rate, and yaw rate sensor outputs along the body-fixed y-axis in response to said roll misalignment angle, said pitch misalignment angle and the yaw misalignment angle; determining the yaw rate along the vehicle body fixed z-axis by projecting the roll rate, pitch rate, and yaw rate sensor outputs along the body-fixed z-axis in response to said roll misalignment angle, said pitch misalignment angle and the yaw misalignment angle; and activating a safety system as a function of said compensated longitudinal acceleration, lateral acceleration, vertical acceleration, roll rate, pitch rate and yaw together with the other calculated and measured signals.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
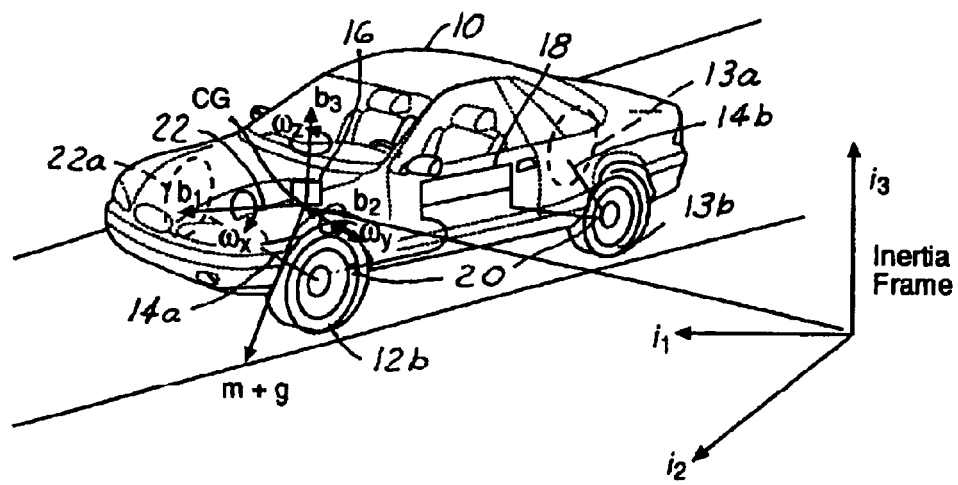
FIG. 1 is a diagrammatic view of a vehicle with variable vectors and coordinator frames according to the present invention.

In the following figures the same reference numerals will be used to identify the same components. The present invention is preferably used in conjunction with a dynamic control system for an automotive vehicle such as a yaw stability control system or a roll stability control system. However, the present invention may also be used with deployment or actuation detection for other safety devices such as airbags.

Figure 2:
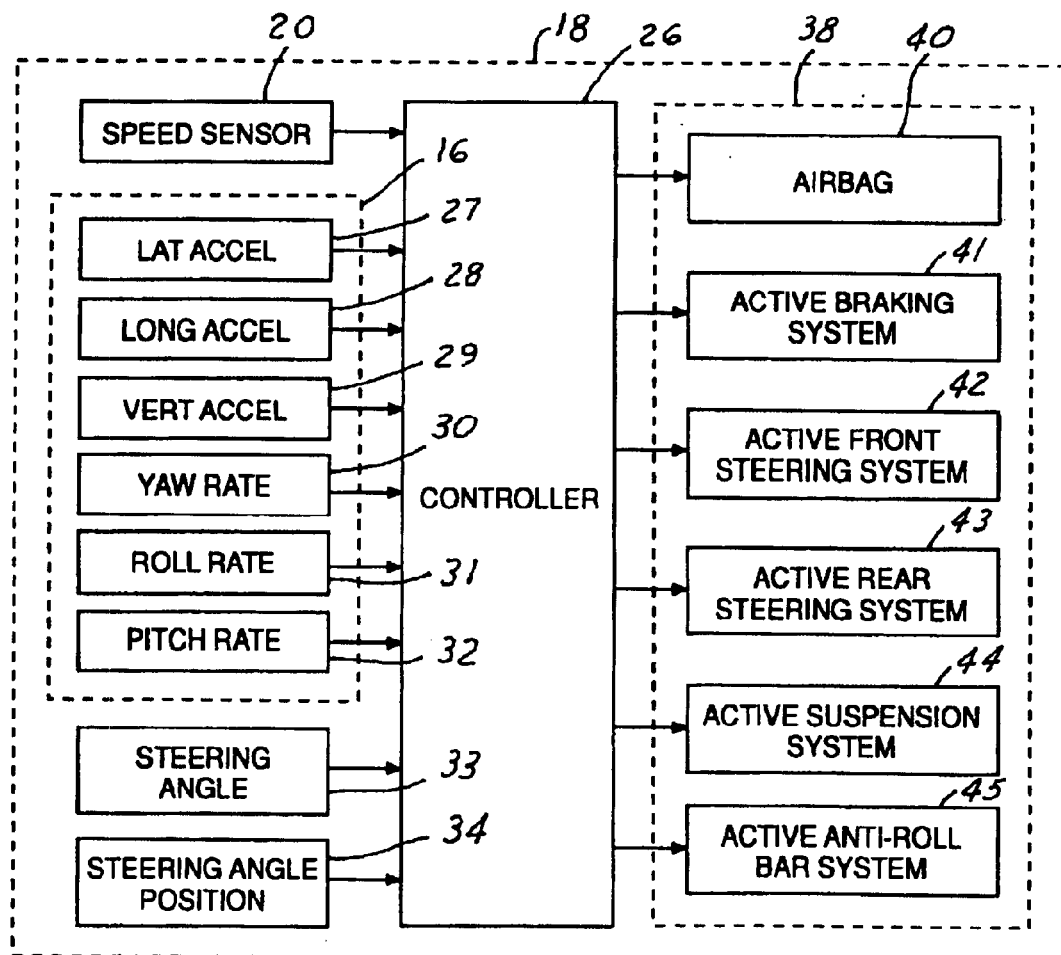
FIG. 2 is a block diagram of a stability system according to the present invention.

Referring to FIGS. 1 and 2, an automotive vehicle 10 with a safety system of the present invention is illustrated with various forces and moments thereon. Vehicle 10 has front right and front left tires 12a and 12b and rear right tires 13a and left rear tires 13b, respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. As shown schematically in FIG. 2, the sensing system 16 preferably uses a six sensor set including three axial acceleration sensors including a lateral acceleration sensor 27, a longitudinal acceleration sensor 28 and a vertical acceleration sensor 29 and three axial rotation rate detectors including a yaw rate sensor 30, a roll rate sensor 31 and a pitch rate sensor 32. Other sensors such as a steering angle sensor 33 and steering angle position sensor 34 may also be provided. The various sensors will be further described below. The wheel speed sensors 20 are mounted at each corner of the vehicle, and the rest of the sensors of sensing system 16 are preferably mounted directly on the center of gravity of the vehicle body, along the directions x, y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $w_x$ for the roll rate, $w_y$ for the pitch rate and $w_z$ for the yaw rate.

The longitudinal acceleration sensor (28) is mounted with its sensing direction along $b_1$-axis, and its output is denoted as $\alpha_x$. The lateral acceleration sensor (27) is mounted with its sensing direction along $b_2$-axis, and its output is denoted as $\alpha_y$. The vertical acceleration sensor (29) is mounted with its sensing direction along $b_3$-axis, and its output is denoted as $\alpha_z$. Of course, some slight misalignments may occur as described below to prevent the sensors from being perfectly aligned with the axes.

A controller 26 is used for receiving information from the speed sensor 20, acceleration sensors 27–29, angular rate sensors 30–32, steering angle sensor 33, and steering angle position sensor 34. Depending on the desired sensitivity of the system and various other factors, not all the sensors 27–34 may be used in a commercial embodiment.

In the preferred embodiment the sensors are located at the center of gravity of the vehicle. Those skilled in the art will recognize that the sensor may also be located off the center of gravity and translated equivalently thereto.

Based upon inputs from the sensors, controller 26 may control a safety device 38. Safety device 38 may comprise an airbag 40, an active braking system 41, an active front steering system 42, an active rear steering system 43, an active suspension system 44, and an active anti-roll bar system 45, or combinations thereof. Each of the systems 40–44 may have their own controllers for activating each one. For example, in a steering based rack-and-pinion system, the two wheels coupled thereto are simultaneously controlled. Based on the inputs from the sensors, controller 26 determines a yaw and/or a roll condition of the vehicle and controls one or more of the safety devices 38.

Speed sensor 20 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error. Also, a transmission sensor may be used to determine vehicle speed.

Figure 3:
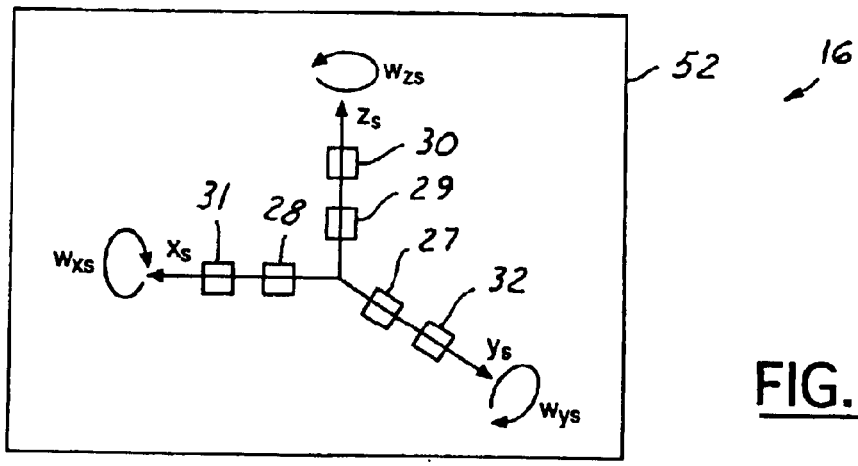
FIG. 3 is a diagrammatic view of a sensor system according to the present invention.

Referring now to FIG. 3, sensing system 16 is shown having yaw rate sensor 30, roll rate sensor 31 and pitch rate sensor 32 together with lateral acceleration sensor 27, a longitudinal acceleration sensor 28, and vertical acceleration sensor 29 mounted within a housing 52.

Because the housing 52 and sensors therein may be manufactured in a highly controlled environment, it is presumed that the sensors are each orthogonally aligned along the sensor axes ($x_s, y_s, z_s$), where $x_s$ is the sensor system longitudinal direction, for which longitudinal acceleration sensor 28 is used to measure longitudinal acceleration $\alpha_{xs}$ and roll rate sensor 31 is used to measure the roll angular rate $\omega_{xs}$; $y_s$ is the lateral direction of the sensing system 16, for which lateral acceleration sensor 27 is used to measure the lateral acceleration $\alpha_{ys}$ and the pitch rate sensor 32 is used to measure the pitch angular rate $\omega_{ys}$; $z_s$ is the vertical direction of the sensing system 16, for which vertical acceleration sensor 29 is used to measure the vertical acceleration $\alpha_{zs}$ and yaw rate sensor 30 is used to measure its yaw rate $\omega_{zs}$.

Figure 4:
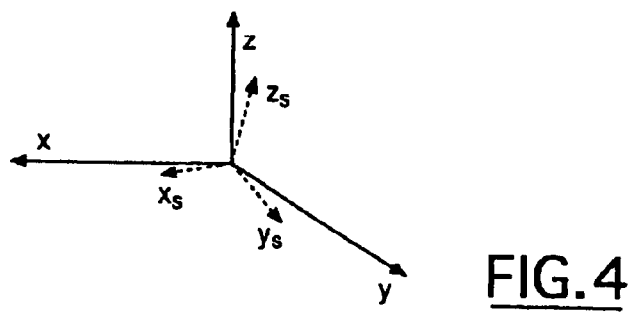
FIG. 4 is a diagrammatic view of misaligned sensor axes.

Referring now to FIG. 4, a mounting error between the sensor system axes ($x_s, y_s, z_s$) and the vehicle body-fixed axes (x,y,z) is illustrated.

Figure 5:
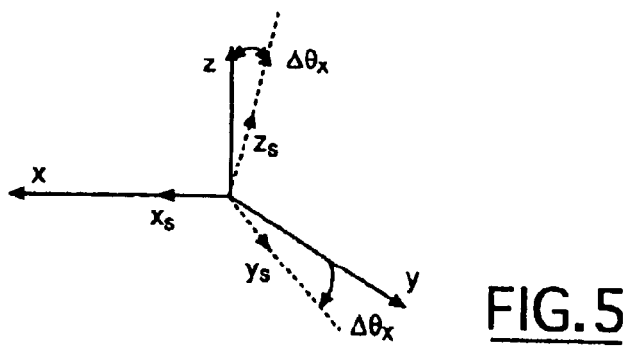
FIG. 5 is a diagrammatic view of misaligned sensor axes along the roll direction.
Figure 6:
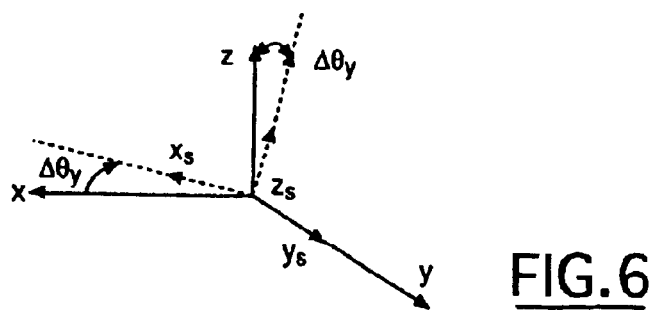
FIG. 6 is a diagrammatic view of misaligned sensor axes along the pitch direction.
Figure 7:
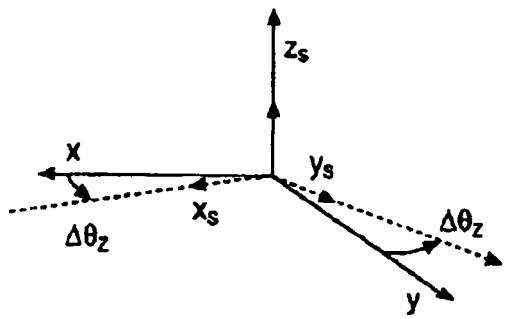
FIG. 7 is a diagrammatic view of misaligned sensor axes along the yaw direction.

Referring now to FIGS. 5, 6 and 7, the mounting error can be characterized by the Euler angles between the (x,y,z)-axes and ($x_s, y_s, z_s$)-axes. Those Euler angles are called respectively the roll directional sensor misalignment $\Delta\theta_x$, the pitch directional sensor misalignment $\Delta\theta_y$ and the yaw directional sensor misalignment $\Delta\theta_z$. FIG. 5 illustrates a roll misalignment, FIG. 6 illustrates a pitch misalignment and FIG. 7 illustrates a yaw misalignment.

The roll direction sensor misalignment (angle) $\Delta\theta_x$, which is the rotational position between the vehicle body-fixed axes (x,y,z) and the sensor system-fixed axes ($x_s, y_s, z_s$), can be obtained by rotating the (x,y,z)-axes along its x-axis by an angle $\Delta\theta_x$. The vehicle motion variables $\alpha_y$ and $\omega_z$ defined along the vehicle body axes can be related to the sensor measurements through such a roll misalignment as in the following $$\alpha_y = -\alpha_{zs}\sin(\Delta\theta_x) + \alpha_{ys}\cos(\Delta\theta_x)$$
$$\omega_z = \omega_{zs}\cos(\Delta\theta_x) + \omega_{ys}\sin(\Delta\theta_x) \quad (1)$$

Notice that along the vehicle lateral axis y, the vehicle lateral acceleration can also be related to the vehicle body frame variables as in the following $$\alpha_y = \dot{v}_y + \omega_z v_x - g\theta_x \quad (2)$$

where $v_x$ is the vehicle velocity (measured along the vehicle body fixed x-axis), which can be estimated based on the wheel speed sensor as described above, g=9.8 m/s² and $\theta_x$ is the global roll angle of the vehicle. $\omega_z$ is the yaw rate of the body measured along the vehicle body fixed z-axis. $v_y$ is the body lateral velocity measured along the vehicle body fixed y-axis. Due to the misalignment, the global roll angle of the sensor system is equal to the vehicle roll angle (the roll angle of the vehicle body fixed frames with respect to the sea level) plus the misalignment $\Delta\theta_x$.

A similar relationship is true for the sensor output $\alpha_{ys}$ along the sensor lateral axis $y_s$ by relating to the other sensor outputs and the global roll angle of the sensor system, which is $\theta_x + \Delta\theta_x$. Notice that since the sensor frames and the vehicle body frames share the same x-axis, the roll misalignment $\Delta\theta_x$ would not change $v_x$, hence $$\alpha_{ys} = \dot{v}_{ys} + \omega_{zs}v_x - g(\theta_x + \Delta\theta_x) \quad (3)$$

In steady state driving conditions, both the vehicle $\dot{v}_y = 0$ (measured along the vehicle body fixed y-axis) and $\dot{v}_y = 0$ (measured along the sensor system frame fixed y-axis), therefore $$\alpha_y = \alpha_{ys} + (\omega_z - \omega_{zs})v_x - g\Delta\theta_x \quad (4)$$

with $v_x$ as the vehicle travel velocity, which can be estimated based on the wheel speed sensor and the other calculated variables. Based on Equation (1) and Equation (4), the roll sensor misalignment angle can be computed as the following $$\Delta\theta_x = \frac{\omega_{zs}v_x}{g - a_{zs} - \omega_{ys}v_x} \quad (5)$$

One advantage of Equation (5) is that there is no need to assume the road conditions. The other advantage is that there is no need to obtain the calculated variable of the global roll angle of the vehicle and only the sensor outputs including yaw rate sensor output, pitch rate sensor output and vehicle longitudinal velocity are used.

Notice that in dynamic driving conditions, $\dot{v}_y \neq 0$, $\dot{v}_{ys} \neq 0$, the actual sensor misalignment needs to be accurately computed as $$\Delta\theta_x = \frac{\omega_{zs}v_x}{g - a_{zs} - \omega_{ys}v_x} + \Delta\theta_{x-dyn-error} \quad (6)$$

where the error term is $$\Delta\theta_{x-dyn-error} = \frac{\dot{v}_y - \dot{v}_{ys}}{g - a_{zs} - \omega_{ys}v_x} \quad (7)$$

Since the sensor misalignment is usually constant or very slow time varying, the low-pass filtered version of the above dynamic characterization is more useful. Let LPF{●} be such a low-pass filter with properly chosen cut-off frequency and considering $$LPF\{\Delta\theta_{x-dyn-error}\} = LPF\left\{\frac{\dot{v}_y - \dot{v}_{ys}}{g - a_{zs} - \omega_{ys}v_x}\right\} \approx 0$$

Therefore $$\Delta\theta_x = LPF\left\{\frac{\omega_{zs}v_x}{g - a_{zs} - \omega_{ys}v_x} + \Delta\theta_{x-dyn-error}\right\}$$
$$\approx LPF\left\{\frac{\omega_{zs}v_x}{g - a_{zs} - \omega_{ys}v_x}\right\}$$

Hence, the actual roll sensor misalignment can be exactly calculated by passing (5) to a low-pass filter.

Now consider the pitch sensor misalignment angle $\Delta\theta_y$, which is the rotational position between the vehicle body-fixed axes (x,y,z) and the sensor system-fixed axes $(x_s,y_s,z_s)$ and which can be obtained by rotating the (x,y,z)-axes along its y-axis by $\Delta\theta_y$. The vehicle body fixed variables of yaw rate can be related to the sensor outputs of yaw rate and roll rate through pitch misalignment $\Delta\theta_y$ as in the following $$\omega_z = \omega_{zs}\cos(\Delta\theta_y) - \omega_{xs}\sin(\Delta\theta_y) \tag{8}$$

Notice that the sensor system y-axis is in the same direction of the vehicle body fixed y-axis, hence the sensor output of the lateral acceleration can be expressed as $$a_{ys} = \dot{v}_y + \omega_z v_x - g\theta_x \tag{9}$$

and substituting (8) into the above Equation (9) leads to $$a_{ys} = \dot{v}_y + [\omega_{zs}\cos(\Delta\theta_y) - \omega_{xs}\sin(\Delta\theta_y)]v_x - g\theta_x \tag{10}$$

Therefore, in a steady state driving condition, (10) leads to the following pitch misalignment computation from the sensor outputs of the lateral acceleration, roll rate and yaw rate together with the calculated vehicle body global roll angle and the calculated vehicle longitudinal velocity $$\Delta\theta_y = \sin^{-1}\left(\frac{a_{ys} + g\theta_x}{v_x\sqrt{\omega_{xs}^2 + \omega_{zs}^2}}\right) + \sin^{-1}\left(\frac{\omega_{zs}}{\sqrt{\omega_{xs}^2 + \omega_{zs}^2}}\right) \tag{11}$$

In dynamic driving condition, the actual sensor pitch misalignment needs to be computed as the following $$\Delta\theta_y = \sin^{-1}\left(\frac{a_{ys} + g\theta_x}{v_x\sqrt{\omega_{xs}^2 + \omega_{zs}^2}}\right) + \sin^{-1}\left(\frac{\omega_{zs}}{\sqrt{\omega_{xs}^2 + \omega_{zs}^2}}\right) + \Delta\theta_{y-dyn-error} \tag{12}$$

where the error term can be computed as in the following.

$$\Delta\theta_{y-dyn-error} = \sin^{-1}\left(-\frac{\dot{v}_y}{v_x\sqrt{\omega_{xs}^2 + \omega_{zs}^2}}\right) \tag{13}$$

Since the sensor misalignment is usually constant or very slow time varying, the low-pass filtered version of the above dynamic characterization is more useful. Let LPF{●} be such a low-pass filter with properly chosen cut-off frequency and considering $$LPF\{\Delta\theta_{y-dyn-error}\} = LPF\left\{\sin^{-1}\left(-\frac{\dot{v}_y}{v_x\sqrt{\omega_{xs}^2 + \omega_{zs}^2}}\right)\right\} \approx 0$$

Therefore $$\Delta\theta_y = LPF\left\{\sin^{-1}\left(\frac{a_{ys} + g\theta_x}{v_x\sqrt{\omega_{xs}^2 + \omega_{zs}^2}}\right) + \sin^{-1}\left(\frac{\omega_{zs}}{\sqrt{\omega_{xs}^2 + \omega_{zs}^2}}\right)\right\}$$

Hence the actual pitch sensor misalignment can be exactly calculated by passing (11) through a low-pass filter.

The yaw direction sensor misalignment angle $\Delta\theta_z$, which is the rotational position between the vehicle body-fixed axes (x,y,z) and the sensor system-fixed axes $(x_s,y_s,z_s)$ can be obtained by rotating the (x,y,z)-axes along its z-axis by $\delta\theta_z$. The vehicle motion variables $\alpha_y$ defined along the vehicle body fixed y-axis can be related to the sensor outputs of longitudinal and lateral accelerations through the yaw misalignment $\Delta\theta_z$ as in the following $$\alpha_y = \alpha_{xs}\sin(\Delta\theta_z) + \alpha_{ys}\cos(\Delta\theta_z) \tag{14}$$

and this body-fixed $\alpha_y$ can also be expressed as $$\alpha_y = \dot{v}_y + \omega_{zs}v_x - g\theta_x \tag{15}$$

Under steady state driving condition, from Equation (14) and (15), the yaw misalignment can be computed as in the following from the sensor outputs of lateral and vertical accelerations, the yaw rate together with the calculated vehicle global roll angle and the vehicle longitudinal velocity $$\Delta\theta_z = \sin^{-1}\left(\frac{\omega_{zs}v_x - g\theta_x}{\sqrt{a_{xs}^2 + a_{ys}^2}}\right) - \sin^{-1}\left(\frac{a_{ys}}{\sqrt{a_{xs}^2 + a_{ys}^2}}\right) \tag{16}$$

In the dynamic driving condition, the actual yaw misalignment can be expressed as $$\Delta\theta_z = \sin^{-1}\left(\frac{\omega_{zs}v_x - g\theta_x}{\sqrt{a_{xs}^2 + a_{ys}^2}}\right) - \sin^{-1}\left(\frac{a_{ys}}{\sqrt{a_{xs}^2 + a_{ys}^2}}\right) + \Delta\theta_{z-dyn-error} \tag{17}$$

where the error term can be calculated as $$\Delta\theta_{z-dyn-error} = \sin^{-1}\left(\frac{\dot{v}_y}{\sqrt{a_{xs}^2 + a_{ys}^2}}\right) \tag{18}$$

Since the sensor misalignment is usually constant or very slow time varying, the low-pass filtered version of the above dynamic characterization is more useful. Let LPF{●} be such a low-pass filter with properly chosen cut-off frequency and considering $$LPF\{\Delta\theta_{z-dyn-error}\} = LPF\left\{\sin^{-1}\left(\frac{\dot{v}_y}{\sqrt{a_{xs}^2 + a_{ys}^2}}\right)\right\} \approx 0$$

Therefore $$\Delta\theta_z = LPF\left\{\sin^{-1}\left(\frac{\omega_{zs}v_x - g\theta_x}{\sqrt{a_{xs}^2 + a_{ys}^2}}\right) - \sin^{-1}\left(\frac{a_{ys}}{\sqrt{a_{xs}^2 + a_{ys}^2}}\right)\right\}$$

Hence the actual yaw sensor misalignment can be exactly calculated by passing (16) to a low-pass filter.

For the sensor system, its global roll and pitch angles are defined as $\theta_{xs}$ and $\theta_{ys}$. These terms may also be calculated based on the sums of the vehicle's global roll angle $\theta_x$, pitch angle $\theta_y$ and the computed sensor roll misalignment $\Delta\theta_x$, the sensor pitch misalignment $\Delta\theta_y$, i.e., $$\theta_{xs} = \theta_x + \Delta\theta_x$$

$$\theta_{ys} = \theta_y + \Delta\theta_y \quad (19)$$

For these Euler angles, $$\dot{\theta}_{xs} = \omega_{xs} + \omega_{zs}\theta_{ys}$$

$$\dot{\theta}_{ys} = \omega_{ys} - \omega_{zs}\theta_{xs} \quad (20)$$

Considering the sensor misalignments are constant, hence $$\dot{\theta}_x = \omega_{xs} + \omega_{zs}(\theta_y + \Delta\theta_y)$$

$$\dot{\theta}_y = \omega_{ys} - \omega_{zs}(\theta_x + \Delta\theta_x) \quad (21)$$

Hence the following can be computed:

$$\Delta\theta_y = LPF\left\{\frac{\dot{\theta}_x - \omega_{xs} - \omega_{zs}\theta_y}{\omega_{zs}}\right\} \quad (22)$$

$$\Delta\theta_x = LPF\left\{\frac{\dot{\theta}_y - \omega_{ys} + \omega_{zs}\theta_x}{\omega_{zs}}\right\}$$

Based on the above calculated sensor misalignment, the vehicle motion angular rates and accelerations defined along the vehicle body axes as measured by the six sensors may be compensated from the sensor outputs. The compensated signals are thus used to control one or more of the safety systems.

Figure 8:
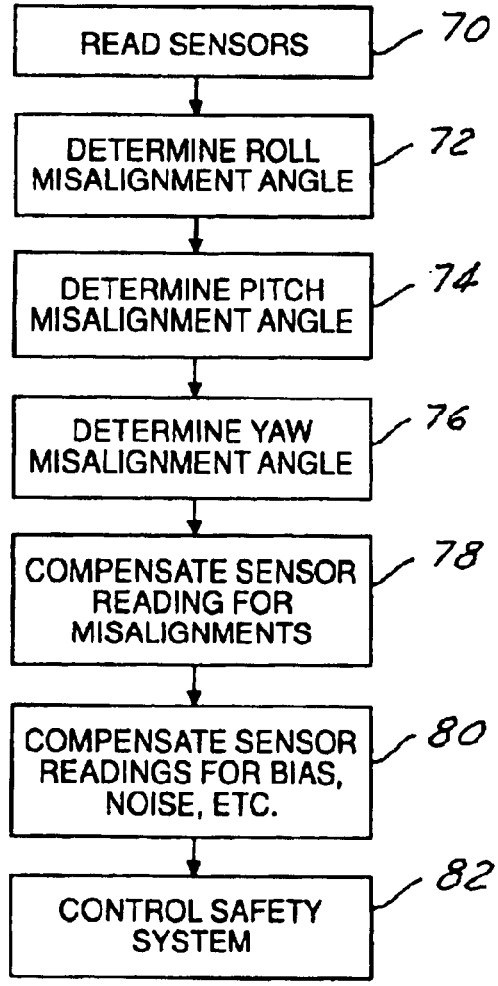
FIG. 8 is flow chart of determination according to the present invention.

Referring now to FIG. 8, a method of controlling a safety system is illustrated. In step 70, the various sensors are read. The various sensors may include the sensors shown in FIG. 2. In step 72, the roll misalignment angle is determined. In step 74, the pitch misalignment angle is determined. In step 76, the yaw misalignment angle is determined. Once each of the misalignment angles is determined, the various sensor readings are corrected for misalignments in step 78. Each of the three acceleration sensors and the angular rate sensors are compensated for roll, pitch and yaw misalignment angles in step 78. More specifically, the three accelerations measured along the vehicle body-fixed frames can be obtained by compensating the sensor outputs of the corresponding three accelerations (measured along the sensor system frame-fixed axes) as in the following $$a_{x-compensated} = a_{xs}\cos(\Delta\theta_z)\cos(\Delta\theta_y) + \\ a_{ys}[-\sin(\Delta\theta_z)\cos(\Delta\theta_x) + \\ \cos(\Delta\theta_z)\sin(\Delta\theta_y)\sin(\Delta\theta_x)] + \\ a_{zs}[\sin(\Delta\theta_z)\sin(\Delta\theta_x) + \\ \cos(\Delta\theta_z)\sin(\Delta\theta_y)\cos(\Delta\theta_x)]$$

$$a_{y-compensated} = a_{xs}\sin(\Delta\theta_z)\cos(\Delta\theta_y) + \\ a_{ys}[\cos(\Delta\theta_z)\cos(\Delta\theta_x) + \\ \sin(\Delta\theta_z)\sin(\Delta\theta_y)\sin(\Delta\theta_x)] + \\ a_{zs}[\cos(\Delta\theta_z)\sin(\Delta\theta_x) + \\ \sin(\Delta\theta_z)\sin(\Delta\theta_y)\cos(\Delta\theta_x)]$$

$$a_{z-compensated} = -a_{xs}\sin(\Delta\theta_z) + \\ a_{ys}[\cos(\Delta\theta_y)\sin(\Delta\theta_x)] + \\ a_{zs}[\cos(\Delta\theta_y)\cos(\Delta\theta_x)]$$

The three angular rates measured along the vehicle body-fixed frames can be obtained by compensating the sensor outputs of the corresponding three angular rate signals (measured along the sensor system frame-fixed axes) as in the following $$\omega_{x-compensated} = \omega_{xs}\cos(\Delta\theta_z)\cos(\Delta\theta_y) + \\ \omega_{ys}[-\sin(\Delta\theta_z)\cos(\Delta\theta_x) + \\ \cos(\Delta\theta_z)\sin(\Delta\theta_y)\sin(\Delta\theta_x)] + \\ \omega_{zs}[\sin(\Delta\theta_z)\sin(\Delta\theta_x) + \\ \cos(\Delta\theta_z)\sin(\Delta\theta_y)\cos(\Delta\theta_x)]$$

$$\omega_{y-compensated} = \omega_{xs}\sin(\Delta\theta_z)\cos(\Delta\theta_y) + \\ \omega_{ys}[\cos(\Delta\theta_z)\cos(\Delta\theta_x) + \\ \sin(\Delta\theta_z)\sin(\Delta\theta_y)\sin(\Delta\theta_x)] + \\ \omega_{zs}[\cos(\Delta\theta_z)\sin(\Delta\theta_x) + \\ \sin(\Delta\theta_z)\sin(\Delta\theta_y)\cos(\Delta\theta_x)]$$

$$\omega_{z-compensated} = -\omega_{xs}\sin(\Delta\theta_z) + \\ \omega_{ys}[\cos(\Delta\theta_y)\sin(\Delta\theta_x)] + \\ \omega_{zs}[\cos(\Delta\theta_y)\cos(\Delta\theta_x)]$$

In addition, each of the sensor readings may also be corrected for bias and noise in step 80 using a sensor bias compensation factor and/or a noise bias compensation factor. Each of these factors may be experimentally determined based upon the type of sensors used and their operating characteristics. The biasing compensation factor may also be determined over time.

In response to the compensated angular rate signals and the compensated acceleration signals, the various safety systems of the vehicle are controlled in step 82.

While particular embodiments of the invention have been shown and described, numerous variations and alternate embodiments will occur to those skilled in the art. Accordingly, it is intended that the invention be limited only in terms of the appended claims.

What is claimed is:

1. A method for controlling a vehicle dynamics control system comprising:
   determining a roll misalignment angle;
   determining a pitch misalignment angle;
   determining a yaw misalignment angle; and activating a safety system as a function of said roll misalignment angle, the pitch misalignment angle and the yaw misalignment angle.

2. A method as recited in claim 1 further comprising measuring a roll rate, measuring a yaw rate, measuring a pitch rate, and generating a corrected roll rate, a corrected yaw rate and a corrected pitch rate as a function of said roll misalignment angle, the pitch misalignment angle and the yaw misalignment angle.

3. A method as recited in claim 1 further comprising measuring a lateral acceleration, a longitudinal acceleration, and a vertical acceleration, and generating a corrected lateral acceleration, a corrected longitudinal acceleration and a corrected vertical acceleration as a function of said roll misalignment angle, the pitch misalignment angle and the yaw misalignment angle.

4. A method as recited in claim 1 further comprising determining a global roll angle as a function of the roll misalignment angle.

5. A method as recited in claim 1 further comprising determining a global pitch angle as a function of the pitch misalignment angle.

6. A method as recited in claim 1 further comprising determining a global yaw angle as a function of the yaw misalignment angle.

7. A method as recited in claim 1 wherein determining a roll misalignment angle comprises determining a roll misalignment angle as a function of a yaw rate from a yaw rate sensor, a pitch rate from a pitch rate sensor, and at least one of an acceleration from an acceleration sensor, a pitch angle or a roll angle.

8. A method as recited in claim 1 wherein determining a pitch misalignment angle comprises determining a pitch misalignment angle as a function of a yaw rate from a yaw rate sensor, a roll rate from a roll rate sensor and at least one of a lateral acceleration from a lateral acceleration sensor, a roll angle or a pitch angle.

9. A method as recited in claim 1 wherein determining a yaw misalignment angle comprises determining a yaw misalignment angle as a function of a yaw rate from a yaw rate sensor, a lateral acceleration from a lateral acceleration sensor, and a longitudinal acceleration from a longitudinal acceleration sensor.

10. A method as recited in claim 1 wherein determining a roll misalignment angle comprises measuring a yaw rate from a yaw rate sensor, a vertical acceleration from a vertical acceleration sensor, a pitch rate from a pitch rate sensor and a vehicle speed from a vehicle speed sensor in accordance with the equation $$\Delta \theta_x = \frac{\omega_{zs} v_x}{g - a_{zs} - \omega_{ys} v_x}$$

and low-pass filtering $\Delta \theta_x$.

11. A method as recited in claim 1 wherein determining roll misalignment angle comprises measuring a yaw rate from a yaw rate sensor, measuring a pitch rate from a pitch rate sensor, calculating a roll angle and calculating a pitch angle in accordance with the following $$\Delta \theta_x = \frac{\dot{\theta}_y - \omega_{ys} + \omega_{zs} \theta_x}{\omega_{zs}}$$

and low-pass filtering $\Delta \theta_x$.

12. A method as recited in claim 1 wherein determining a pitch misalignment angle comprises measuring a yaw rate from a yaw rate sensor, measuring a roll rate from a roll rate sensor, measuring vehicle speed from a vehicle speed sensor, measuring a lateral acceleration from a lateral acceleration sensor, and calculating a roll angle in accordance with the following $$\Delta \theta_y = \sin^{-1}\left(\frac{a_{ys} + g\theta_x}{v_x \sqrt{\omega_{xs}^2 + \omega_{zs}^2}}\right) + \sin^{-1}\left(\frac{\omega_{zs}}{\sqrt{\omega_{xs}^2 + \omega_{zs}^2}}\right)$$

and low-pass filtering $\Delta \theta_y$.

13. A method as recited in claim 1 wherein determining a pitch misalignment angle comprises measuring a yaw rate from a yaw rate sensor, measuring a roll rate from a roll rate sensor, and calculating a roll angle and calculating a pitch angle, in accordance with the following $$\Delta \theta_y = \frac{\dot{\theta}_x - \omega_{xs} - \omega_{zs} \theta_y}{\omega_{zs}}$$

and low-pass filtering $\Delta \theta_y$.

14. A method as recited in claim 1 wherein determining a yaw misalignment angle comprises measuring a yaw rate from a yaw rate sensor, measuring a lateral acceleration from a lateral acceleration sensor, measuring a longitudinal acceleration from a longitudinal acceleration sensor, and calculating a roll angle, in accordance with the following $$\Delta \theta_z = \sin^{-1}\left(\frac{\omega_{zs} v_x - g\theta_x}{\sqrt{a_{xs}^2 + a_{ys}^2}}\right) - \sin^{-1}\left(\frac{a_{ys}}{\sqrt{a_{xs}^2 + a_{ys}^2}}\right)$$

and low-pass filtering $\Delta \theta_z$.

15. A method for controlling a vehicle dynamics control system comprising:
   determining a roll misalignment angle;
   determining a global roll angle as a function of the roll angle misalignment;
   determining a pitch misalignment angle;
   determining a global pitch angle as a function of the pitch angle misalignment;
   determining a yaw misalignment angle;
   determining a global yaw angle as a function of the yaw angle misalignment; and
   activating a safety system in response to said global roll angle, said global pitch angle, and said global yaw angle.

16. A control system for an automotive vehicle having a vehicle body comprising:
   a sensor system having a housing oriented within the vehicle body;
   a roll angular rate sensor positioned within the housing generating a roll angular rate signal corresponding to roll angular motion of the sensor housing;
   a yaw angular rate sensor positioned within the housing generating a yaw rate signal corresponding to a yaw motion of the sensor housing;
   a pitch angular rate sensor positioned within the housing generating a pitch rate signal corresponding to a pitch motion of the sensor housing;
   a lateral acceleration sensor positioned within the housing generating a lateral acceleration signal corresponding to a lateral acceleration of the sensor housing;
   a longitudinal acceleration sensor positioned within the housing generating a longitudinal acceleration signal corresponding to the longitudinal acceleration of the sensor housing;

a vertical acceleration sensor positioned within the housing generating a vertical acceleration signal corresponding to the vertical acceleration of the sensor housing;

a wheel speed sensor generating a wheel speed signal corresponding to a wheel speed of the vehicle;

a safety system; and a controller coupled to said roll angular rate sensor, said yaw angular rate sensor, said pitch angular rate sensor, said lateral acceleration sensor, said longitudinal acceleration sensor, said vertical acceleration sensor and said wheel speed sensor, said controller determining a roll misalignment angle; determining a pitch misalignment angle; determining a yaw misalignment angle as a function of said roll rate, said pitch rate, said yaw rate, said lateral acceleration, said longitudinal acceleration and said vertical acceleration, said controller generating a control signal for controlling said safety system in response to said roll misalignment angle, said pitch misalignment angle and said yaw misalignment angle.

17. A system as recited in claim 16 wherein said controller generates a corrected roll rate signal, a corrected yaw rate signal and a corrected pitch rate signal as a function of said roll misalignment angle, the pitch misalignment angle and the yaw misalignment angle, said controller generating said control signal as a function of the corrected roll rate signal, the corrected yaw rate signal and a corrected pitch rate signal.

18. A system as recited in claim 16 wherein said controller generates a corrected lateral acceleration, a corrected longitudinal acceleration and a corrected vertical acceleration as a function of said roll misalignment angle, the pitch misalignment angle and the yaw misalignment angle, said controller generating said control signal as a function of the corrected lateral acceleration, the corrected longitudinal acceleration and the corrected vertical acceleration.

* * * * *